United States Patent [19]

Tamura

[11] 4,389,092

[45] Jun. 21, 1983

[54] HIGH SPEED AMBIGUITY FUNCTION EVALUATION BY OPTICAL PROCESSING UTILIZING A SPACE VARIANT LINEAR PHASE SHIFTER

[75] Inventor: Poohsan N. Tamura, Bloomington, Minn.

[73] Assignee: Honeywell Inc., Minneapolis, Minn.

[21] Appl. No.: 173,319

[22] Filed: Jul. 29, 1980

[51] Int. Cl.³ .................... G06G 9/00; G01S 13/58
[52] U.S. Cl. .................. 350/162.12; 343/9 PS; 364/822
[58] Field of Search ............ 350/162 SF; 343/9 PS; 364/822, 861

[56] References Cited

U.S. PATENT DOCUMENTS

| | | | |
|---|---|---|---|
| 4,108,538 | 8/1978 | Felstead | 350/162 SF |
| 4,123,142 | 10/1978 | Fleming et al. | 364/822 |
| 4,286,328 | 8/1981 | Bocker | 364/822 |
| 4,310,894 | 1/1982 | Lee et al. | 364/822 |

Primary Examiner—Bruce Y. Arnold
Attorney, Agent, or Firm—Stephen W. Buckingham; Omund R. Dahle

[57] ABSTRACT

A system for using optical data processing means to create the ambiguity function for two signals is disclosed. One-dimensional spatial light modulators are employed to code the signals into a beam of substantially coherent light. After the light has been coded with the first one-dimensional signal a Fourier Transform is performed by lens means. A linear phase shifter is placed in the Fourier Transform plane. This has the effect of creating a linear dependence along a second dimension when a second Fourier Transform is performed.

9 Claims, 9 Drawing Figures

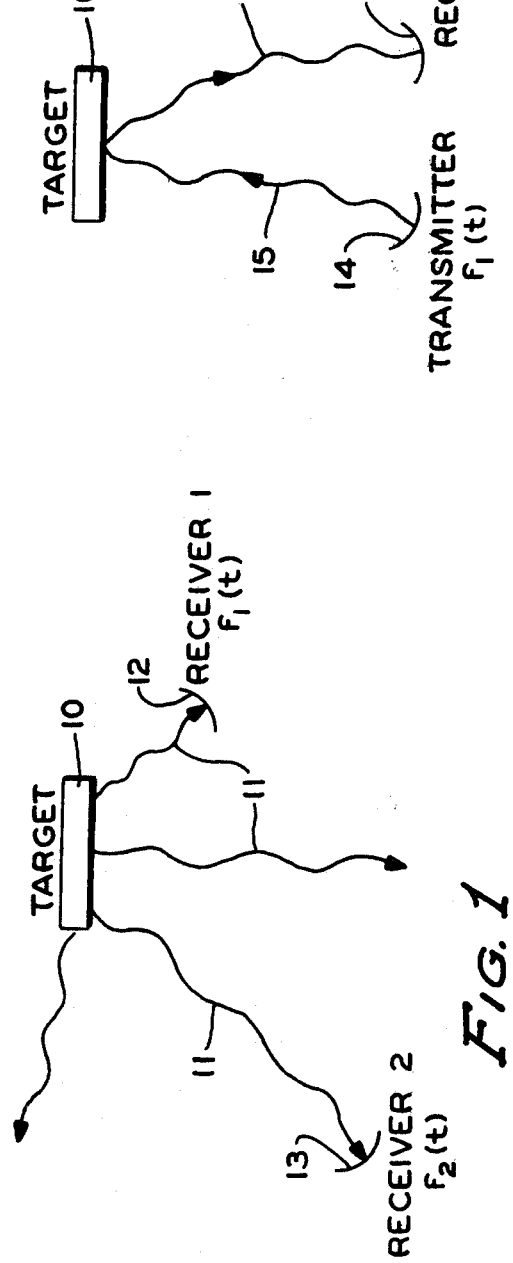
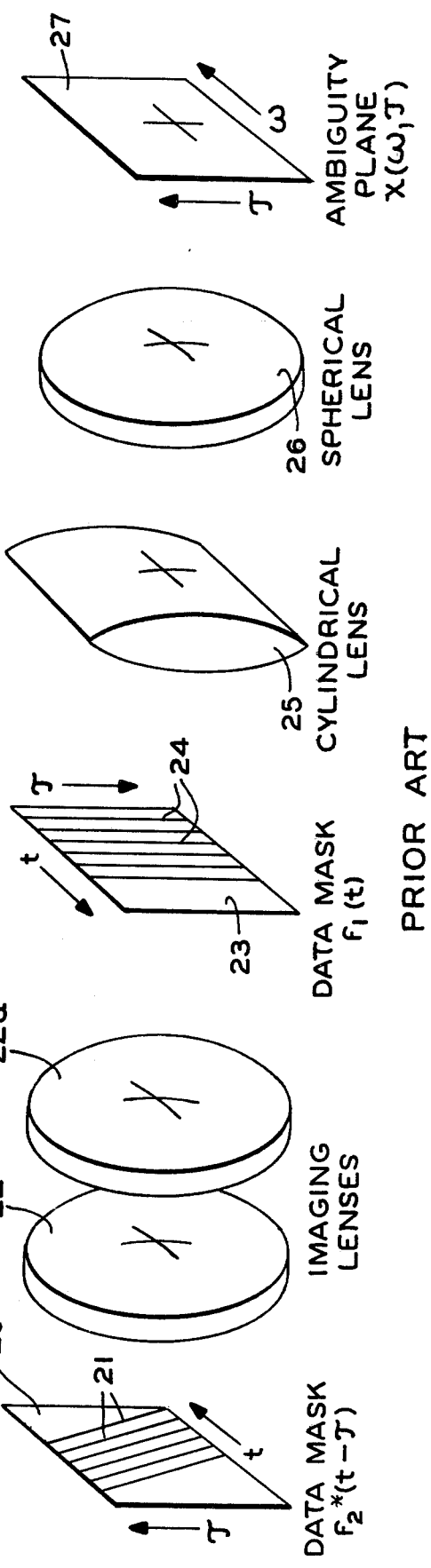
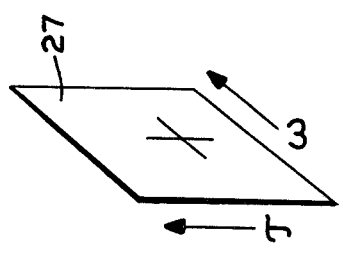
FIG. 1
FIG. 1A
FIG. 2 PRIOR ART

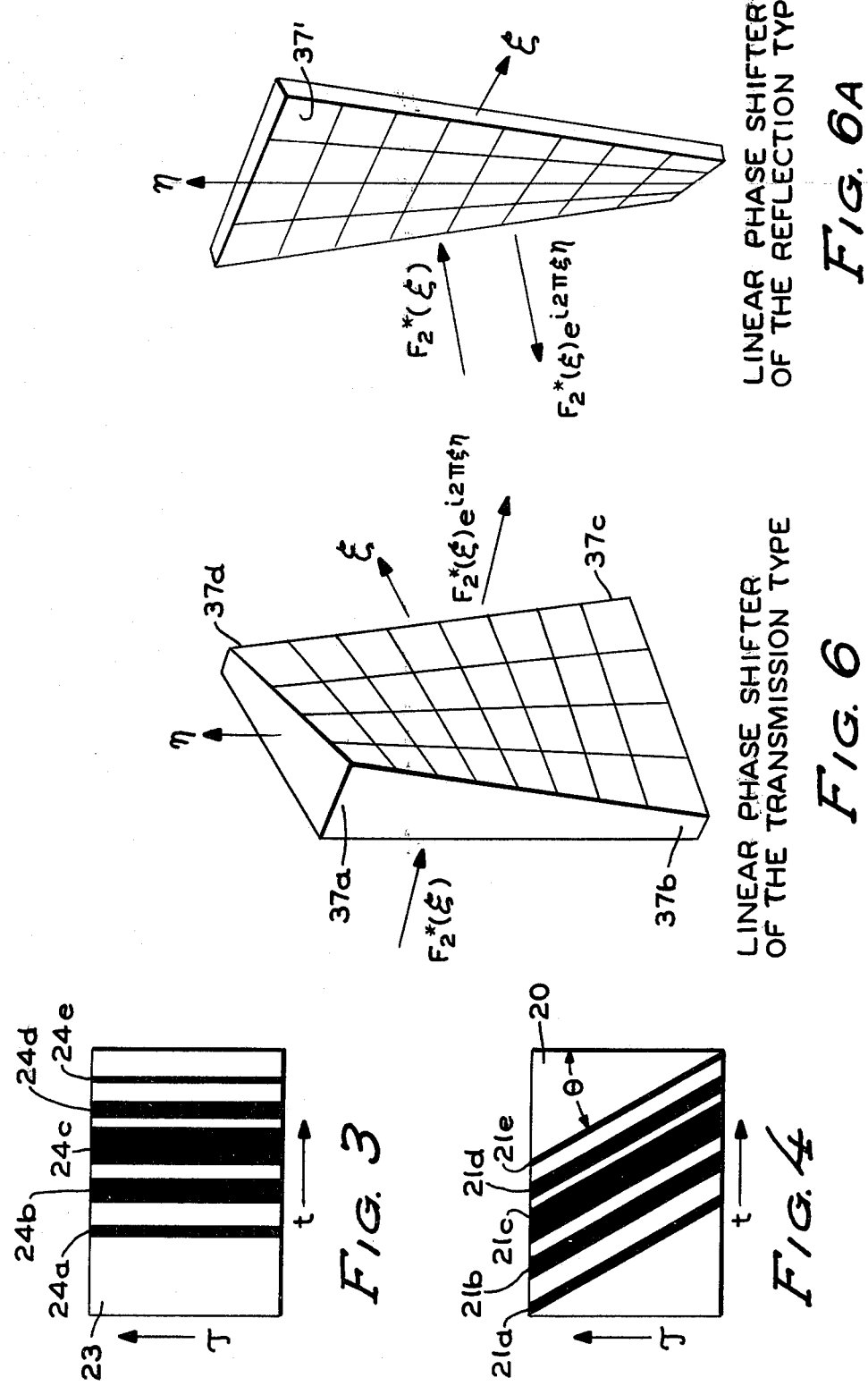

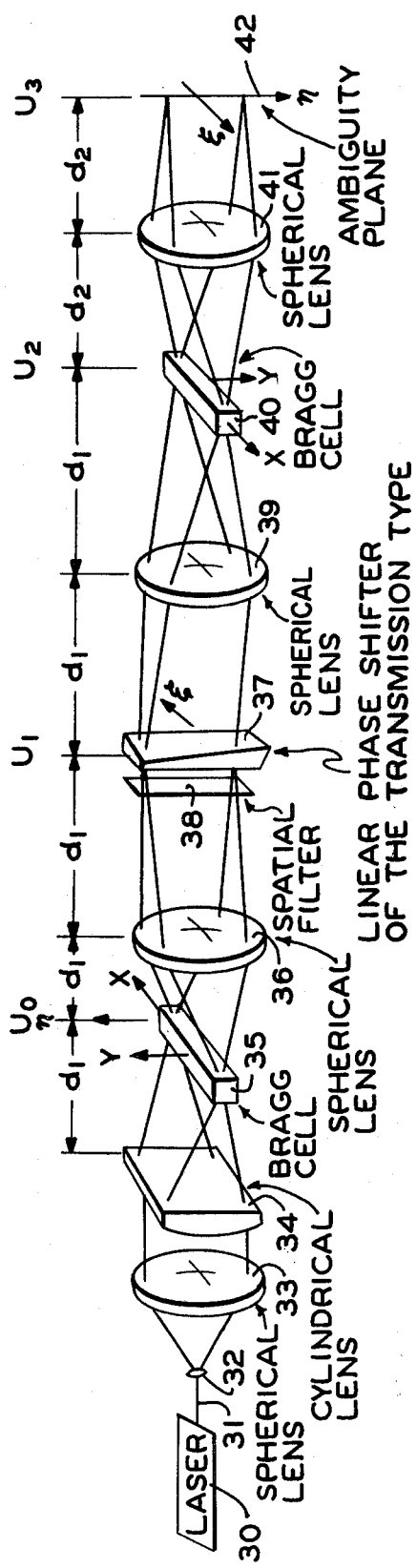
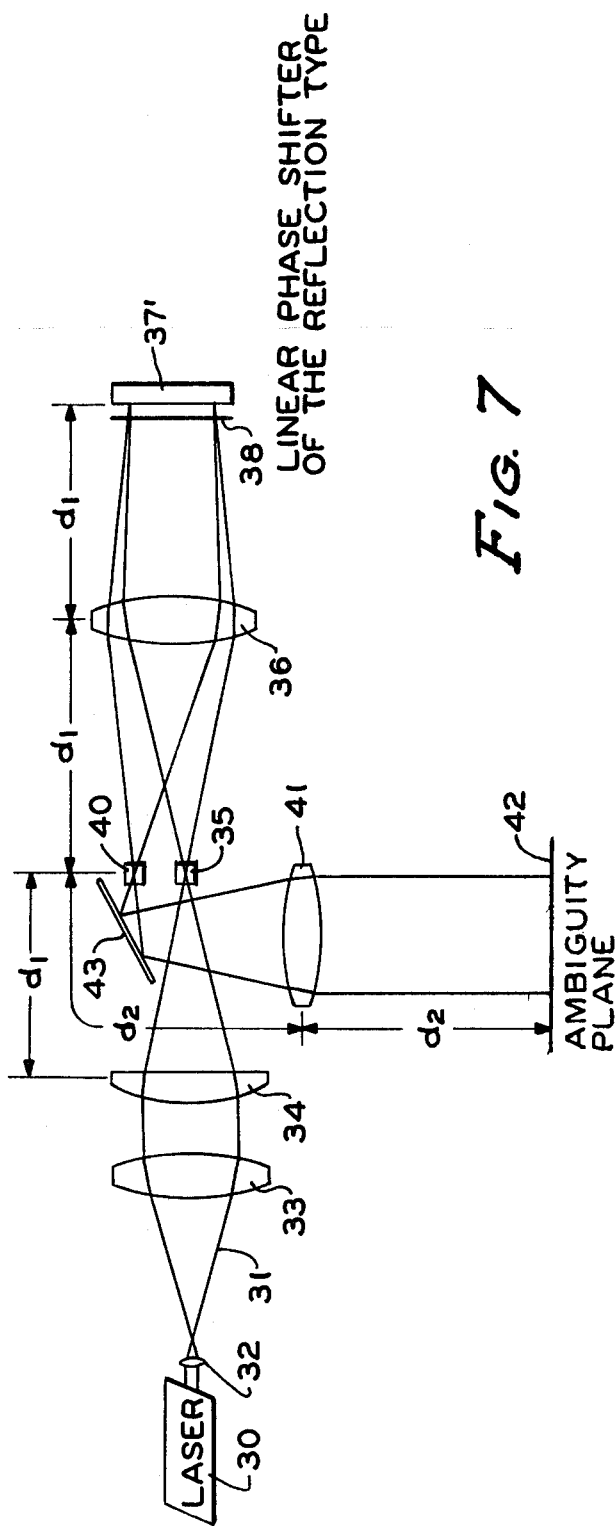

HIGH SPEED AMBIGUITY FUNCTION EVALUATION BY OPTICAL PROCESSING UTILIZING A SPACE VARIANT LINEAR PHASE SHIFTER

The Government has rights in this invention pursuant to contract N00014-80-C-0216 awarded by the Department of the Navy.

BACKGROUND OF THE INVENTION

Under many circumstances an acoustic or electromagnetic signal is received from a moving source and information as to the location and velocity of the source is desirable. Examples of where this occurs are undersea surveillance and radar surveillance. A common method of representing this is on a graph known as an ambiguity plane, where distance is plotted against velocity as revealed by the relative doppler shift between two signals. The relative time shift and doppler shift between two signals so received can be used to construct this graph.

The ambiguity plane is prepared by evaluating the ambiguity integral which is defined as $$\chi(\nu,\tau) = \int f_1(t) f_2^*(t-\tau) e^{-i2\pi\nu\omega} dt \qquad (1)$$

In this equation $f_1(t)$ and $f_2(t)$ are the two signals being compared expressed as functions of time. The variable $\tau$ is introduced to correct for the fact that although it is expected that $f_1(t)$ and $f_2(t)$ should have a similar form, they will, in general, be shifted in time relative to each other. The function $f_2^*(t-\tau)$ is the complex conjugate of $f_2(t-\tau)$ which is the time shifted version of the signal actually received. The factor $e^{-i2\pi\nu\tau}$ is introduced to correct for the frequency difference between $f_1(t)$ and $f_2(t)$, caused by the doppler effect. The values of $\nu$ and $\tau$ which yield a maximum value of the ambiguity integral may be used to extract information about the velocity and range of the object under surveillance.

In order to be useful for surveillance purposes the information displayed on an ambiguity surface must be as current as possible. For this reason evaluation of the integral (1) must be performed in real time. The ability of optical analog processing to process multiple channels of data rapidly in a parallel fashion has led to its acceptance as a method for ambiguity function calculations. A common procedure involves the preparation of data masks for $f_1(t)$ and $f_2^*(t-\tau)$ with t on the horizontal axis and $\tau$ on the vertical. Optical data processing means perform the multiplication and integration in equation (1) leaving a $\nu$ dependence on the horizontal axis and a $\tau$ dependence on the vertical. The graph thus produced is then searched for its greatest value, which is the maximum of the ambiguity integral.

The most important limiting factor on the speed of these prior art devices is the production of the data masks. Although the data mask for $f_1(t)$ has no $\tau$ dependence and that for $f_2^*(t-\tau)$ has only a linear $\tau$ dependence, they are normally constructed through the use of two-dimensional spatial light modulators (SLM's). Accordingly a simpler and more rapid means of coding the light beam with the data would significantly decrease the time required to produce an ambiguity plane.

The copending application, Ser. No. 105,809, filed Dec. 20, 1979, now U.S. Pat. No. 4,310,894, assigned to the same assignee as the instant invention, reveals a system in which one-dimensional spatial light modulators may be used in place of two-dimensional ones. Although inherently faster than the prior art, that system requires a minimum of four cylindrical lenses, which are more difficult and expensive to produce than spherical ones. It also requires a demagnification stage which significantly increases the path length and, as a result, the size of the apparatus. Therefore it is desirable to build an optical system to perform ambiguity processing retaining the use of one-dimensional spatial light modulators, but eliminating the need for some of the cylindrical lenses and the demagnification stage.

SUMMARY OF THE INVENTION

The previously cited copending application revealed an apparatus which uses a one-dimensional SLM to code a light beam in a manner similar to the coding which would be produced by a data mask of the form shown in FIG. 3. The image is then rotated to duplicate the coding which would be produced by a mask of the form used in FIG. 4. The instant invention replaces the rotation step with a shearing process performed by a linear phase shifter. It is possible to think of this process as a stretching of the positive end of the $\tau$ axis of FIG. 3 in one direction and the negative end of the $\tau$ axis in the opposite direction while the center is held stationary. The shearing is accomplished by means of a linear phase shifter inserted in the first Fourier transform plane. A more complete understanding may be obtained from the detailed description which follows.

BRIEF DESCRIPTION OF THE DRAWINGS

FIG. 1 is a basic scenario in which ambiguity processing is useful.

FIG. 1(A) is a variation of FIG. 1.

FIG. 2 is a typical optical ambiguity processor of the prior art.

FIG. 3 is a data mask used in optical data processing to encode light beams with functions of the form f(t).

FIG. 4 is a data mask used in optical data processing to encode light beams with functions of the form $f(t-\tau)$.

FIG. 5 is a preferred embodiment of the invention using a linear phase shifter of the transmission type.

FIG. 6 shows a linear phase shifter of the transmission type.

FIG. 6A shows a linear phase shifter of the reflection type.

FIG. 7 is a preferred embodiment of the invention using a linear phase shifter of the reflection type.

DETAILED DESCRIPTION OF THE INVENTION THE PRIOR ART

FIG. 1 shows a typical situation where ambiguity processing is used. A target 10 emits a signal, represented by arrows 11, in all directions. The signal is received by a first receiver 12 and a second receiver 13. It is clear that if the target is moving there will be a different doppler shift observed by the two receivers 12 and 13. If the receivers 12 and 13 are different distances from the target 10 the signals 11 will also arrive at different times. Therefore the signal observed by receiver 12 is of the form $$f_1(t) = \mu(t) e^{i\omega_1 t} \qquad (2)$$

and the signal $f_2(t)$ observed by receiver 13 is of the form $$f_2(t) = \mu(t+t_o)e^{i\omega_2(t+t_o)} \quad (3)$$

In these expressions $\mu(t)$ may be regarded as a function modulating a carrier wave. In equation (3) $t_o$ is a constant which expresses the difference of propagation time for the signal received by the first receiver 12 and the second receiver 13. In general $t_o$ may be positive, negative or zero. If $t_o$ is positive, the signal arrives at receiver 12 before it arrives at receiver 13. If $t_o$ is negative the signal arrives at receiver 13 first. If $t_o$ is zero both receivers 12 and 13 receive the signal at the same time. The terms $e^{i\omega_1\tau}$ and $e^{i\omega_2(t+t_o)}$ are carrier waves of angular frequency $\omega_1$ and $\omega_2$ respectively. The difference between $\omega_1$ and $\omega_2$ is the relative doppler shift. It is clear that the ambiguity function of equation (1) will take on a maximum value when $$2\pi\nu = \omega_1 - \omega_2 \text{ and } \tau = -t_o \quad (4)$$

It should be noted that these signals could arise from radar surveillance, as shown in FIG. 1(A). In the case of radar, a transmitter 14 emits a signal 15. Signal 15 is designated $f_1(t)$ and has the form shown in equation (2). Signal 15 strikes target 16 and returns as reflected signal 17. Reflected signal 17 is received by receiver 18. Reflected signal 17 is designated $f_2(t)$ and has the form of equation (3) where $t_o$ is the time elapsed between the transmission of signal 15 by transmitter 14 and the reception of reflected signal 17 by receiver 18. For radar surveillance $t_o$ will always be positive. If the target 16 is moving relative to transmitter 14 and receiver 18 $\omega_2$ will be doppler shifted from the original value of $\omega_1$. The following analysis applies equally to the situations shown in FIGS. 1 and 1(A).

An examination of equation (1) reveals a strong similarity to a Fourier transform. If $F_t$ is the Fourier transform operator which acts on the time variable, the following definition applies:

$$F_t[g(t,\tau)] = \int g(t,\tau)e^{-i2\pi\nu t}dt \quad (5)$$

If $g(t,\tau)$ is taken to be $$g(t,\tau) = f_1(t)f_2^*(t-\tau) \quad (6)$$

it is apparent that a simple substitution will make equation (1) and equation (5) identical. Therefore the product of $f_1(t)$ and $f_2^*(t-\tau)$ of equation (6) is produced and optically Fourier transformed to evaluate equation (1).

FIG. 2 illustrates a typical system of the prior art. Coherent light from a laser, not shown, is expanded and collimated by lenses, not shown, and impinges on data mask 20. The function $f_2^*(t-\tau)$ is encoded on data mask 20 in the form of lines 21. The $\tau$ variable is represented in the horizontal direction and the $\tau$ variable in the vertical. Lenses 22 and 22a image data mask 20 on data mask 23. Data mask 23 is encoded with $f_1(t)$ represented by lines 24. As a result the light passing data mask 23 is encoded with the product $f_1(t)f_2^*(t-\tau)$. The light next passes through cylindrical lens 25 and spherical lens 26 and arrives at the ambiguity plane 27. The effect of the lenses is that the resultant image is Fourier transformed in the horizontal or t dimension and imaged in the vertical or $\tau$ dimension. Therefore the image represents the integral (1). The maximum value appears as the point of greatest light intensity, i.e., the brightest point.

FIG. 3 shows an expanded view of data mask 23. The lines 24a, 24b, 24c, 24d, and 24e represent the coded data $f_1(t)$. Because there is no $\tau$ dependence the value of $f_1(t)$ is the same for all values of $\tau$ associated with a particular value of t. This is apparent from the fact that the lines used to code the data run parallel to the $\tau$ axis.

FIG. 4 shows an expanded view of data mask 20. Lines 21a, 21b, 21c, 21d, and 21e represent the coded form of the function $f_2^*(t-\tau)$. The linear dependence is apparent in the angle they make with the $\tau$ axis.

Data masks 20 and 23 are produced by the use of a two-dimensional spatial light modulator. Production of a mask with such a modulator requires many linear scans and is the limiting factor on the speed of the system. U.S. Pat. No. 4,017,907 to David Paul Casasent shows an improvement by substituting an electronically-addressed light modulator (EALM) tube for one of the data masks. An EALM tube is a multiple scan unit, however, with the same limitations inherent in all two-dimensional light modulators.

THE INVENTION

The present invention replaces data masks 20 and 23 with one-dimensional spatial light modulators and a linear phase shifter. FIG. 5 shows a preferred embodiment of the invention using a linear phase shifter of the transmission type. A coherent source such as a laser 30 emits a light beam 31, which is expanded and recollimated by microscope objective 32 and spherical lens 33. The light beam 31 then strikes cylindrical lens 34, which focuses the beam into a line lying within the one-dimensional SLM 35. The signal $f_2(t)$ or $f_2^*(t)$ is applied to one-dimensional SLM 35, with the x axis of one-dimensional SLM 35 corresponding to the t variable. If the signal used is $f_2(t)$ the complex conjugate must be obtained by a spatial filtering process.

The light passing through one dimensional SLM 35 is coded with the applied function and then expands until it impinges upon spherical Fourier Transform lens 36. Spherical lens 36 Fourier transforms the signal coded into the light beam by one-dimensional SLM 35. The Fourier transformed image appears at the location of the linear phase shifter of the transmission type 37. It is the linear phase shifter which performs the shearing function on the applied image. Spatial filter 38, which may be placed so that the light beam 31 passes it directly before or directly after the linear phase shifter, is used to obtain $f_2^*(t)$ from $f_2(t)$ if necessary.

Light beam 31 expands once more until it strikes spherical Fourier Transform lens 39. The beam 31 is then compressed into a line again so that it may be coded by one-dimensional SLM 40. The signal $f_1(t)$ is applied to one-dimensional SLM 40 with the x axis of one-dimensional SLM 40 corresponding to the t variable.

After passing through one-dimensional SLM 40 light beam 31 expands until it strikes spherical Fourier Transform lens 41. The Fourier Transform of the signal coded in light beam 31 prior to spherical lens 41 is performed and appears in the Fourier Transform plane 42. Because the Fourier Transform of the signal impinging upon spherical lens 41 is the ambiguity function arising from signals $f_1(t)$ and $f_2(t)$, plane 42 is the ambiguity plane.

Means for detecting the light intensity distribution is placed in ambiguity plane 42. A vidicon to provide read out on a CRT or an array of photodetectors may be used. Other detection means will be apparent to those skilled in the art.

In FIG. 5 one-dimensional SLMs 35 and 40 are shown as the type of acousto-optic modulators known as Bragg cells. Although Bragg cells are used in the preferred embodiment the invention is not limited to them, and other one-dimensional SLMs may be used.

It is important that cylindrical lens 34 and spherical lenses 36 and 39 have the same focal length, shown as $d_1$ in FIG. 5. In a laboratory version of the invention the focal length of lenses 34, 36, and 39 is 750 mm, while the focal length of spherical lens 41, represented by $d_2$, is 350 mm. The laboratory version operates at a rate of 500 frames per second. While this is faster than the prior art systems described and allows the desired real time evaluation of the ambiguity function, it is believed that much higher evaluation rates are possible with the invention.

In order to establish that the optical scheme of FIG. 5 will perform as described in the foregoing discussion, it is necessary to mathematically analyze the effect of the various elements on light beam 31. To facilitate the mathematical analysis the plane passing through one-dimensional SLM 35 perpendicular to light beam 31 will be identified as the $U_o$ plane, the plane of the linear phase shifter 37 will be the $U_1$ plane, the plane passing through one-dimensional SLM 40 perpendicular to light beam 31 will be the $U_2$ plane and the ambiguity plane 42 will be the $U_3$ plane. In the untransformed planes, $U_o$ and $U_2$ the variables x and y will be used on the axes, while $\xi$ and $\eta$ will be used in the Fourier Transform planes $U_1$ and $U_3$. The light field in each plane will be denoted by the symbol for that plane while $-$ or $+$ written as a superscript will represent the field slightly before or after that plane. Thus $U_o^-(x,y)$ represents the light field slightly before plane $U_o$ and $U_3(\xi,\eta)$ represents that on plane $U_3$. For simplicity it will be assumed that signal $f_2^*(t)$ is applied to one-dimensional SLM 35.

It is apparent that light beam 31 is focused into a line in $U_o$ so that the field slightly before that plane is closely approximated by $$U_o^-(x,y) = \delta(y) \qquad (7)$$

where $\delta(y)$ is a Dirac delta function. One-dimensional SLM 35 modulates this according to the applied signal. This gives $$U_o^+(x,y) = f_2^*(x)U_o^-(x,y)$$
$$= f_2^*(x)\delta(y)$$

Spherical Fourier Transform lens 36 takes the Fourier Transform of the expression in equation (8). As a result the field slightly before the linear phase shifter 37 is given by $$U_1^-(\xi,\eta) = \int\int U_o^+(x,y)e^{-i2\pi(\xi x+\eta y)}dxdy$$
$$= F_2^*(-\xi)$$

where $F_2$ is the Fourier Transform of $f_2$. If linear phase shifter 37 is constructed with a transmissivity function of $e^{i2\pi\xi\eta}$ then $$U_1^+(\xi,\eta) = e^{i2\pi\xi\eta}U_1^-(\xi,\eta)$$
$$= e^{i2\pi\xi\eta}F_2^*(-\xi)$$

$U_1^+(\xi,\eta)$ is Fourier Transformed by spherical lens 39. The result slightly before plane $U_2$ is $$U_2^-(x,y) = \int\int U_1^+(\xi,\eta)e^{-i2\pi(\xi x+\eta y)}d\xi d\eta \qquad (11)$$
$$= \int F_2^*(-\xi)[\int e^{i2\pi\xi\eta}e^{-i2\pi\eta y}d\eta]e^{-i2\pi\xi x}d\xi$$
$$= \int F_2^*(-\xi)\delta(\xi - y)e^{-i2\pi\xi x}d\xi$$
$$= \int F_2^*(-y)e^{-i2\pi xy}$$

It may be seen that the extent of $U_2^-(x,y)$ in the y dimension is equal to the bandwidth of $f_2^*(t)$ times a scaling factor determined by the nature of linear phase shifter 37. Therefore although SLM 40 is essentially one-dimensional it is important that it have a large enough window along the y axis to accommodate the anticipated bandwidth of $f_2^*(t)$. In order to prevent the size of the field from exceeding the window of one-dimensional SLM 40 $f_2^*(t)$ may be bandlimited.

Passing through one-dimensional spatial light modulator 40, light beam 31 is modulated by the applied signal $f_1(t)$. The result just past the $U_2$ plane is $$U_2^+(x,y) = f_1(x)U_2^-(x,y) \qquad (12)$$
$$= f_1(x)F_2^*(-y)e^{-i2\pi xy}$$

Light beam 31 proceeds onward passing through spherical lens 41 which takes the Fourier Transform of $U_2^+(x,y)$. The Fourier Transform appears in the ambiguity plane 42. Mathematically the distribution there is represented by $$U_3(\xi,\eta) = \int\int U_2^+(x,y)e^{-i2\pi(\xi x+\eta y)}dxdy \qquad (13)$$
$$= \int\int f_1(x)[\int F_2^*(-y)e^{-i2\pi xy}e^{-i2\pi\eta y}dy]e^{-i2\pi\xi x}dx$$
$$= \int f_1(x)f_2^*(x - \eta)e^{-i2\pi\xi x}dx$$

The similarity of equations (1) and (13) is readily apparent. A simple substitution of $\tau$ for $\eta$ and $\nu$ for $\xi$ in equation 13) would make them identical. It is therefore established that Fourier Transform plane 42 is in fact the desired ambiguity plane.

FIG. 6 shows a linear phase shifter of the transmission type 37 which is used in the embodiment shown in FIG. 5 to perform the shearing function. It may be seen from the drawing that the thickness of the phase shifter varies across its surface. For example the portion identified as 37a is thicker than the portion identified as 37b. At the remote edge the portion 37c may be thicker than the portion 37d. The variation in thickness is selected so that light passing through the phase shifter will be subject to a phase change, the magnitude of the phase change being determined by the portion of the block through which the light passes. In the preferred embodiment of the invention the desired phase change, $\phi$, is given by $$\phi = e^{i2\pi\xi\nu} \qquad (14)$$

FIG. 6A shows an alternative type of linear phase shifter 37'. It is a linear phase shifter of the reflection type. In appearance the linear phase shifter of the reflection type looks like a mirror with a slight warp. The amount of warp is determined by the amount of phase change desired. The relative phase change from one portion of the beam to another is caused by the fact that different portions of the beam have different path lengths due to the warp. It should be observed that the lines shown on the faces of the phase shifters 37 and 37' in FIGS. 6 and 6A are to aid visualization only. The linear phase shifter of the transmission type would be a clear block while the linear phase shifter of the reflection type would be an evenly reflective mirror.

FIG. 7 illustrates an embodiment of the invention using a linear phase shifter of the reflection type. The basic operation is very similar to that of the system shown in FIG. 5. Laser 30 emits light beam 31 which is expanded and recollimated by microscope objective 32 and spherical lens 33. Cylindrical lens 34 focuses light beam 31 into a line so that it may be modulated by one-dimensional spatial light modulator 35. The modulating function may be $f_2(t)$ or $f_2^*(t)$ as in FIG. 5. Spherical lens 36 Fourier transforms the function coded into light beam 31. Linear phase shifter of the reflection type 37' imparts the desired phase shift to light beam 31 and reverses its direction. Spatial filter 38 selects out $f_2^*(t)$ if necessary. The spatial filtering could also be accomplished by simply making linear phase shifter 37' narrow enough that only the desired component will be reflected. Spherical lens 36 takes on the function of spherical lens 39 of FIG. 5 and focuses light beam 31 into a line for modulation with $f_1(t)$ by one-dimensional spatial light modulator 40. Folding mirror 43 is used to direct light beam 31 to any convenient location for readout. Spherical lens 41 Fourier transforms the signal emerging from one dimensional spatial light modulator 40. The ambiguity function appears in the ambiguity plane 42. As in the system shown in FIG. 5 various types of detection means may be used ambiguity plane 42.

The embodiments of the invention in which an exclusive right is claimed are defined as follows:

1. An optical system utilizing a beam of substantially coherent light to create the ambiguity function arising from a first signal and a second signal, said system comprising:
   a first data input means for coding said light beam with said first signal;
   a first Fourier Transform lens lying in the path of the coded light beam and a Fourier Transform Plane associated therewith;
   a linear phase shifter lying in the path of said coded light beam in said Fourier Transform plane;
   a second data input means for coding the phase shifted light beam with said second signal; and
   a final Fourier Transform lens means lying in the path of said light beam for producing the ambiguity function at an ambiguity plane.

2. The optical system utilizing a beam of substantially coherent light to create the ambiguity function arising from a first signal and a second signal as described in claim 1 where the linear phase shifter is of the transmission type.

3. The optical system utilizing a beam of substantially coherent light to create the ambiguity function arising from a first signal and a second signal as described in claim 1 where the linear phase shifter is of the reflection type.

4. The optical system utilizing a beam of substantially coherent light to create the ambiguity function arising from a first signal and a second signal as described in claim 1, 2, or 3 where the first and second data input means comprise Bragg cells.

5. The optical system according to claim 1, 2 or 3 and further comprising:
   readout light detecting means at said ambiguity plane.

6. The optical system according to claim 5 where the readout light detecting means comprises a vidicon.

7. The optical system according to claim 6 where the first and second data input means comprise Bragg cells.

8. The optical system according to claim 5 wherein the readout light detecting means comprise an array of photodetectors.

9. The optical system according to claim 8 where the first and second data input means comprise Bragg cells.

* * * * *